United States Patent [19]

Pfefferle et al.

[11] Patent Number: 4,603,547
[45] Date of Patent: Aug. 5, 1986

[54] CATALYTIC RELIGHT COATING FOR GAS TURBINE COMBUSTION CHAMBER AND METHOD OF APPLICATION

[75] Inventors: William C. Pfefferle, Middletown, N.J.; Michael J. Bak, Walled Lake, Mich.

[73] Assignee: Williams Research Corporation, Walled Lake, Mich.

[21] Appl. No.: 195,787

[22] Filed: Oct. 10, 1980

[51] Int. Cl.[4] .............................................. F02C 7/262
[52] U.S. Cl. .................................... 60/39.02; 60/723; 60/39.822
[58] Field of Search .............. 60/723, 39.82 C, 39.02, 60/745; 431/268; 423/529, 556, 247; 422/241; 252/455 R, 466 PT, 477 R

[56] References Cited

U.S. PATENT DOCUMENTS

| | | | |
|---|---|---|---|
| 3,101,593 | 8/1953 | Britton et al. | 60/39.12 |
| 3,113,885 | 12/1963 | Teague | 60/39.82 C |
| 3,513,109 | 5/1970 | Stiles | 252/477 R |
| 3,903,020 | 9/1975 | Sergeys et al. | 252/455 R |
| 3,912,661 | 10/1975 | Numagami et al. | 252/466 PT |
| 4,040,251 | 8/1977 | Heitmann et al. | 60/745 |
| 4,299,086 | 11/1981 | Madgavkar et al. | 60/723 |

FOREIGN PATENT DOCUMENTS

| | | | |
|---|---|---|---|
| 213207 | 11/1957 | Australia | 60/39.82 C |
| 534938 | 12/1956 | Canada | 423/529 |
| 407590 | 3/1934 | United Kingdom | 60/39.82 C |

Primary Examiner—Carlton R. Croyle
Assistant Examiner—Jeffrey A. Simenauer
Attorney, Agent, or Firm—Lyman R. Lyon

[57] ABSTRACT

A construction of a gas turbine combustion chamber which facilitates relighting the fuel immediately after flame-out. The construction comprises a catalytic coating on the combustor wall, preferably with areas left uncoated to allow the flame to propagate away from the combustor wall and into the bulk gas flow.

24 Claims, 4 Drawing Figures

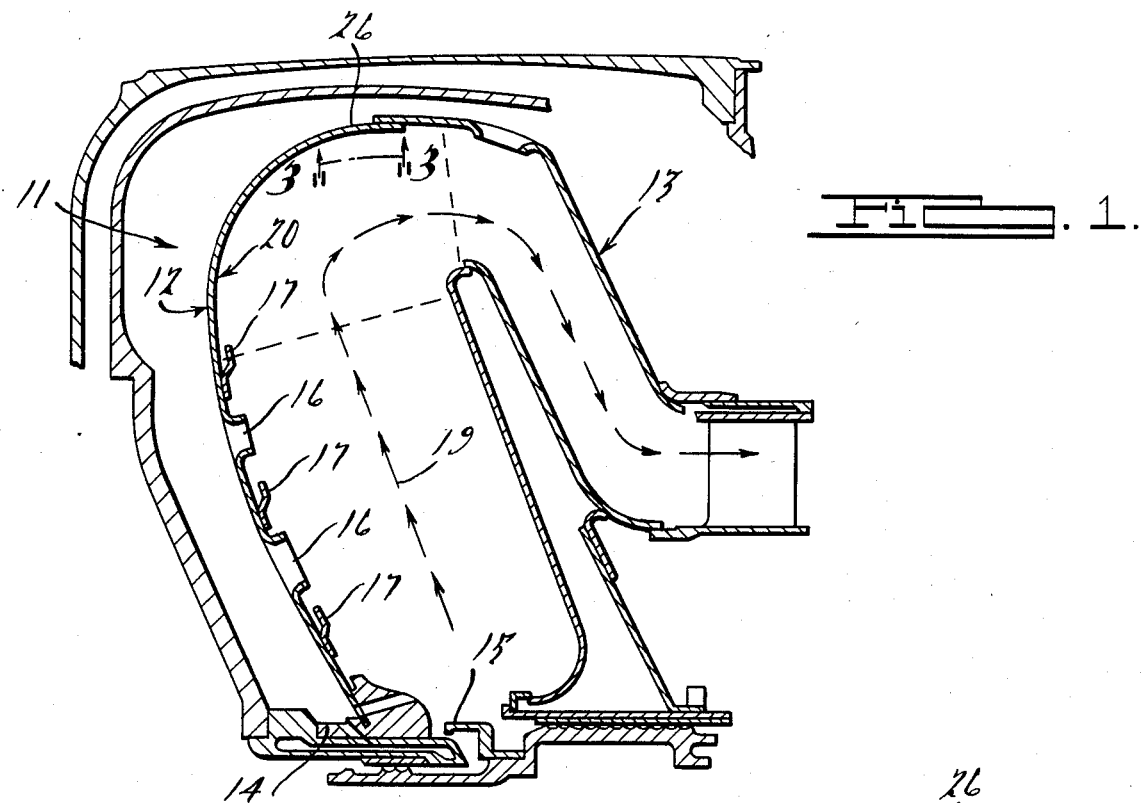
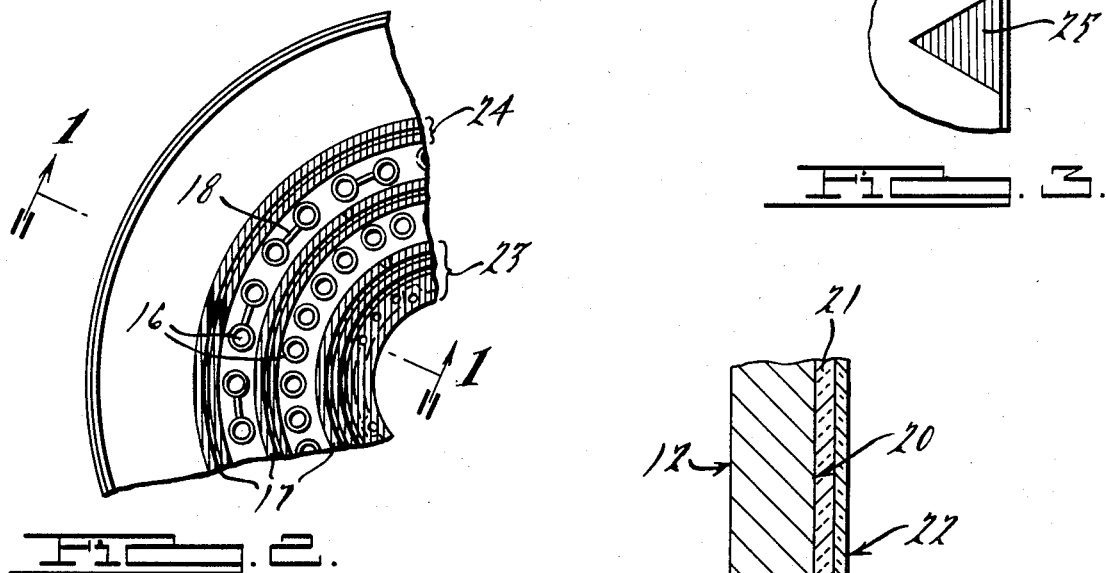
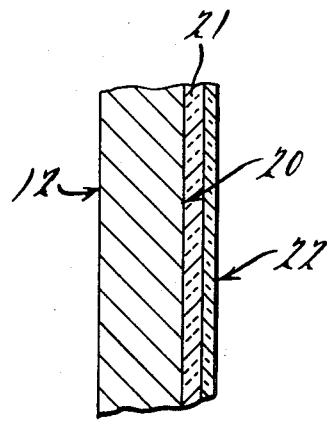

CATALYTIC RELIGHT COATING FOR GAS TURBINE COMBUSTION CHAMBER AND METHOD OF APPLICATION

BACKGROUND OF THE INVENTION

License Rights

The U.S. Government has a paid-up license in this invention and the right in limited circumstances to require the patent owner to license others on reasonable terms as provided for by the terms of Contract No. N00019-78-C-0206 awarded by Department of Navy, Joint Cruise Missile Program.

FIELD OF THE INVENTION

The invention relates to gas turbines, and more particularly to the combustion chambers (combustors) of gas turbines in which flame-out may occur. By "flame-out" is meant the quenching of the flame in the combustor which may occasionally occur due to transient disturbances in the flow of working fluid or due to perturbations, for example a blast in the vicinity such as could occur to a missile-borne gas turbine engine.

DESCRIPTION OF THE PRIOR ART

A number of different suggestions have been made for facilitating the reignition of fuel in a combustion chamber after flame-out. Ignition devices such as spark plugs and flares sometimes lack the durability and heat exchange characteristics necessary to effect proper reignition and are unreliable for relighting under all conditions.

Berl U.S. Pat. No. 2,970,439 and Toone U.S. Pat. No. 3,355,885 show catalytic ignitors in the form of containers or cylinders of catalytic material, used in combination with separate fuel supply means. British Pat. No. 843,780, published July 27, 1960 shows a fuel reignition device involving the insertion of a noble metal protrusion into the combustion chamber. In these known devices, parts are submerged in the gas flow path, increasing the possibility of damage. These prior devices fail to offer the advantages of the present invention which are described below.

Methods of applying a catalyst to a surface, which are useful in the present invention have been developed for the automotive chemical and petrochemical industries and are disclosed in various patents, including Leak U.S. Pat. No. 3,362,783; Hindin U.S. Pat. No. 3,615,166; Sergeys U.S. Pat. No. 3,903,020; and in Pfefferle application Ser. No. 06/139,340, filed Apr. 11, 1980. The latter discloses a method for applying catalyst to nonporous surfaces, a method which is also applicable to porous surfaces.

It is an object of the present invention to provide a novel and improved construction for a gas turbine combustion chamber, and method of reignition, which facilitates relighting in a reliable yet economical manner, and minimizes the risk of failure.

It is another object to provide an improved construction and method of this character which may be utilized with presently existing designs of combustion chambers.

Other objects, features and advantages of the present invention will become apparent from the following description, the appended claims and the accompanying drawings.

Briefly, the invention comprises a gas turbine combustion chamber having a wall with an inner surface exposed to the combustion chamber flame, and a coating of a catalytic material on said surface over a large enough area thereof to cause reignition of the fuel-air mixture after flame-out.

In another aspect, the reignition method of this invention comprises the step of applying a catalytic coating to the inner surface of a gas turbine combustion chamber over a sufficient area to facilitate reignition of the fuel-air mixture in the event of a flame-out.

BRIEF DESCRIPTION OF THE DRAWINGS

FIG. 1 is a cross sectional view in elevation showing a portion of a combustion chamber constructed according to the present invention taken along the line 1—1 of FIG. 2;

FIG. 2 is a portion of the inner surface of the chamber showing the areas with and without coatings;

FIG. 3 is a fragmentary view taken along the line 3—3 of FIG. 1 and showing an uncoated area, and FIG. 4 is an enlarged fragmentary cross-sectional view showing how the catalytic coating is bonded to the thermal barrier coating.

DESCRIPTION OF THE PREFERRED EMBODIMENT

A combustion chamber for a gas turbine is generally indicated at 11 and comprises a forward segment generally indicated at 12 and a rear segment generally indicated at 13. An annular combustion chamber is shown having a central member 14 surrounding the turbine shaft, inlet passages at 15 in the form of a rotating fuel slinger, and inner and outer rows of compressed air inlet passages 16. Air deflector rings 17 are provided inside the chamber which generate a film of air for wall cooling. Optional cooling air slits 18 may also be provided. The bulk flow path of gases through the combustion chamber extends in the direction of the arrow 19. The inner surface of the combustion chamber wall is generally indicated at 20, this wall facing the fuel-air mixture within the combustion chamber. Conventionally, wall 20 is coated with a thermal barrier coating 21 seen in FIG. 4. Typically, this thermal barrier coating is composed of zirconium oxide with 6% yttrium oxide for stabilization of the crystal structure.

According to the invention, a catalytic coating generally indicated at 22 is bonded to the thermal barrier coating. The catalytic coating, which preferably comprises a noble metal catalyst such as platinum, chemically bonded to the thermal barrier coating, will have the function of reigniting the fuel-air mixture in the event of a flame-out. Reignition will result as a consequence of the combined effects of fuel, catalyst, air and sufficiently high temperatures.

Preferably, the catalytic coating is applied over most but not all of the interior surface 20 of forward segment 12 of the combustion chamber. For extreme conditions, it may be required to coat both segments 12 and 13. In order to facilitate relighting, certain areas of surface 20 are preferably left uncoated. In the illustrated embodiment, the uncoated areas are indicated in FIGS. 1, 2 and 3 as being two annular areas 23 and 24 plus a circumferentially spaced series of four triangular areas 25 inside outermost wall portion 26. These areas are partially shaded for emphasis in the figures. Area 23 extends radially inwardly from the inner row of air inlet passages 16, with the narrower uncoated band 24 outside the outer row of air inlet passages.

A suitable method of applying the catalytic relight coating to the gas turbine combustion chamber is shown by the following example: The inner surface 20 of the combustion chamber is previously coated with a zirconium oxide, yttrium oxide thermal barrier 21. The surface to be coated with the catalytic coating is cleaned if necessary by vapor degreasing to assure freedom from dirt, oil or grease. If necessary, suitable masks are employed on surface areas 23, 24 and 25 where no catalytic coating is desired.

A base coat is first applied comprising chloroplatinic acid, zirconyl nitrate and aluminum nitrate, with instruments of such design that no metallic parts come in contact with the coating. This material is applied in light even coats to prevent running. After each coat is applied it is dried in a forced circulating air oven at approximately 200° F. for fifteen minutes at heat and then at approximately 300° F. for twenty minutes at heat.

After a premeasured quantity of base coat has been applied in the aforesaid manner, a top coat is applied in one coat to the specified areas. The part is then dried in the aforesaid manner and any mask material carefully removed.

The coated part is then cured in an air circulating furnace by heating to approximately 250° F. and holding for twenty minutes, raising the temperature to approximately 1300° F., and holding at that temperature for one hour. The part is then furnace cooled to below 1000° F. and then air cooled to room temperature. During this calcination process the noble metal compounds convert to pure metals and the zirconium and aluminum oxides convert to ceramic oxides. The noble metal is bonded to the thermal barrier coating by a matrix of ceramic material similar in composition to the thermal barrier itself. Care is taken to avoid accumulation of fumes in the furnace. The part is then enclosed in a sealed container. Preferred proportions of the base and top coats are as follows:

Base Coat a. 1.1 gm platinum metal in the form of chloroplatinic acid
b. 0.5 gm aluminum nitrate
c. 3.0 cc zirconyl nitrate;

Top Coat a. 0.5 gm palladium chloride
b. 1.0 cc water
c. 3.0 cc zirconyl nitrate Duriang operation of a gas turbine engine having a combustion chamber constructed according to the present invention, in the event of flame-out the presence of the fuel-air mixture at the heated catalytic coating will cause reignition. Flames travelling along the catalytic coating will reach the uncoated areas at which point they will lift away from surface 20 and into the main body of the fuel-air mixture within the combustion chamber. This will facilitate relighting of the mixture within the entire combustion chamber.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

We claim:

1. A gas turbine combustion chamber having a wall with an inner surface exposed to the combustion chamber flame, and a coating of a catalytic material on said surface over a large enough area thereof to cause reignition of the fuel-air mixture after flame-out.

2. The combination according to claim 1, said catalytic coating covering at least 90% of the area of said inner surface.

3. The combination according to claim 1, further provided with areas of said surface having no catalytic coating, whereby the flame adjacent those areas will propagate away from the surface and into the bulk gas flow within the combustion chamber.

4. The combination according to claim 3, said areas having no catalytic coating comprising at least one annular area and circumferentially spaced areas outwardly thereof.

5. The combination according to claim 4, said combustion chamber wall having air inlet passages, one of said uncoated annular areas being located radially inwardly of said air inlet passages, the other annular area being outwardly thereof.

6. The combination according to claim 5, said outward annular area being narrower than the inward area.

7. The combination according to claims 4, 5 or 6, said circumferentially spaced areas comprising a relatively small number of widely spaced areas on the outermost wall portion of said combustion chamber wall.

8. The combination according to claim 7, said widely spaced areas being of triangular shape.

9. The combination according to any of claims 1 to 6, said catalytic coating comprising a noble metal catalyst such as platinum.

10. The combination according to claim 9, said coating comprising a base coat and a top coat, said base coat comprising chloroplatinic acid, zirconyl nitrate and aluminum nitrate, said top coat comprising palladium chloride and zirconyl nitrate.

11. The combination according to claim 10, said base and top coats having the following approximate proportions:

Base Coat a. 1.1 gm platinum metal in the form of chloroplatinic acid
b. 0.5 gm aluminum nitrate
c. 3.0 cc zirconyl nitrate Top Coat a. 0.5 gm palladium chloride
b. 1.0 cc water
c. 3.0 cc zirconyl nitrate 12. The combination according to any of claims 1 to 6, said inner surface having a thermal barrier coating, said catalytic coating being chemically bonded to said thermal barrier coating.

13. A method of facilitating reignition after flame-out in a gas turbine combustion chamber, comprising the step of applying a catalytic coating to the inner surface of said combustion chamber over a sufficient area to facilitate reignition of the fuel-air mixture in the event of a flame-out.

14. The method according to claim 13, further including the step of applying said catalytic coating only on predetermined spaced areas of said combustion chamber surface, whereby the reignited flame will be allowed to propagate away from the combustion chamber wall and into the bulk gas flow of the combustion chamber, the uncoated areas being a relatively small portion of the total surface area.

15. The method according to claim 14, in which the areas left uncoated by said catalytic coating include an annular area and circumferentially spaced areas outwardly thereof.

16. The method according to claims 13, 14 or 15, said catalytic coating including a compound selected from the group containing a compound of platinum and a compound of palladium.

17. The method according to claims 13, 14 or 15, said catalytic coating comprising a base coat and a top coat.

18. The method according to claim 17, said base coat comprising chloroplatinic acid, zirconyl nitrate and aluminum nitrate, said top coat comprising palladium chloride and zirconyl nitrate.

19. The method according to claim 14, said base and top coats having the following approximate proportions:

Base Coat a. 1.1 gm platinum metal in the form of chloroplatinic acid
b. 0.5 gm aluminum nitrate
c. 3.0 cc zirconyl nitrate Top Coat a. 0.5 gm palladium chloride
b. 1.0 cc water
c. 3.0 cc zirconyl nitrate 20. The method according to claim 19, further including the steps of drying the combustion chamber after application of said base coat at a temperature of approximately 200° to 300° F., then applying the top coat, again drying said combustion chamber, and curing the coated combustion chamber at a temperature of approximately 1300° F.

21. The method according to claims 13, 14 or 15, further comprising the step of applying a thermal barrier coating to said inner surface, said catalytic coating being chemically bonded to said thermal barrier coating.

22. The method according to claim 21, said catalytic coating comprising a noble metal compound and zirconium and aluminum compounds, and further comprising the step of calcining said catalytic coating to convert the noble metal compounds to noble metals and the other compounds to ceramic oxides, whereby the noble metal is bonded to the thermal barrier coating by a matrix of ceramic material.

23. A gas turbine combustion chamber comprising
   A. a forward annular portion having a series of inlet holes for admission of compressor air;
   B. a rearward annular portion defining an annular discharge opening adjacent the radially outer region of the combustion chamber for discharge flow of combustion gases and coacting with said forward portion to define an annular opening at their radially inner edges for admission of a slinger member to deliver fuel to said chamber; and
   C. a coating of a catalytic material on at least a portion of the inner annular surface of said forward annular portion to facilitate re-ignition of the combustion flame in the event of a flame-out.

24. A gas turbine combustion chamber according to claim 23 wherein said coating is applied to radially spaced concentric annular portions of said inner surface, whereby to provide annular uncoated portions between the annular coated portions to direct the re-ignited flame on said inner surface rearwardly toward the center of the combustion chamber.

* * * * *